United States Patent [19]

Vaughton

[11] Patent Number: 5,528,744
[45] Date of Patent: Jun. 18, 1996

[54] DATA PROCESSING SYSTEM

[75] Inventor: Matthew K. Vaughton, Romsey, England

[73] Assignee: International Business Machines Corporation, Armonk, N.Y.

[21] Appl. No.: 520,908

[22] Filed: Aug. 30, 1995

Related U.S. Application Data

[63] Continuation of Ser. No. 293,252, Aug. 19, 1994, abandoned, which is a continuation of Ser. No. 671,838, filed as PCT/GB89/00885, Aug. 3, 1989, abandoned.

[51] Int. Cl.[6] .................................................... G06F 3/14
[52] U.S. Cl. .................................................. 395/157
[58] Field of Search .............................. 395/146, 149, 395/164, 155–161

[56] References Cited

U.S. PATENT DOCUMENTS

| | | | |
|---|---|---|---|
| 4,692,858 | 9/1987 | Redford et al. | 395/157 |
| 4,739,314 | 4/1988 | McCaskill et al. | 345/146 |
| 5,040,131 | 8/1991 | Torres | 395/157 |
| 5,050,105 | 9/1991 | Peters | 340/721 |
| 5,079,695 | 1/1992 | Dysart et al. | 395/700 |
| 5,121,478 | 6/1992 | Rao | 395/157 |

FOREIGN PATENT DOCUMENTS 0176950  4/1986  European Pat. Off. .

OTHER PUBLICATIONS

IBM System Application Architecture, Common Access Design Guide; Jun. 1989, IBM Corp., pp. 95–101, 173.
Macintosh System Software User's Guide, Version 6.0, Apple Computer Inc., Copyright 1988, pp. 28.
Microsoft window User's Guide, Version 3.0, Microsoft Coorporation 1985–1990. Chapter 3, pp. 79–98.
"Human–Computer Communication Meeting Software Engineering", IEEE Computer Society Press, ACM, pp. 216–224.

*Primary Examiner*—Mark R. Powell
*Assistant Examiner*—Huynh Ba
*Attorney, Agent, or Firm*—Wayne P. Bailey; Michael A. Davis, Jr.; David A. Mims, Jr.

[57]  ABSTRACT

A data processing system is provided. The system includes a window based display for displaying display windows. A processor executes multiple interleaved data processing tasks. The processor is able to trigger execution of a second task by the processor in response to execution of a first task by the processor The first and second tasks are associated with one or more of the display windows. The processor controls display of the associated display windows on the display. If the processor triggers execution of the second task in response to execution of the first task, the processor controls display of the second task's display window(s) to be visually connected to and move with the first task's display window(s) in response to data identifying the first task's display window(s).

12 Claims, 2 Drawing Sheets

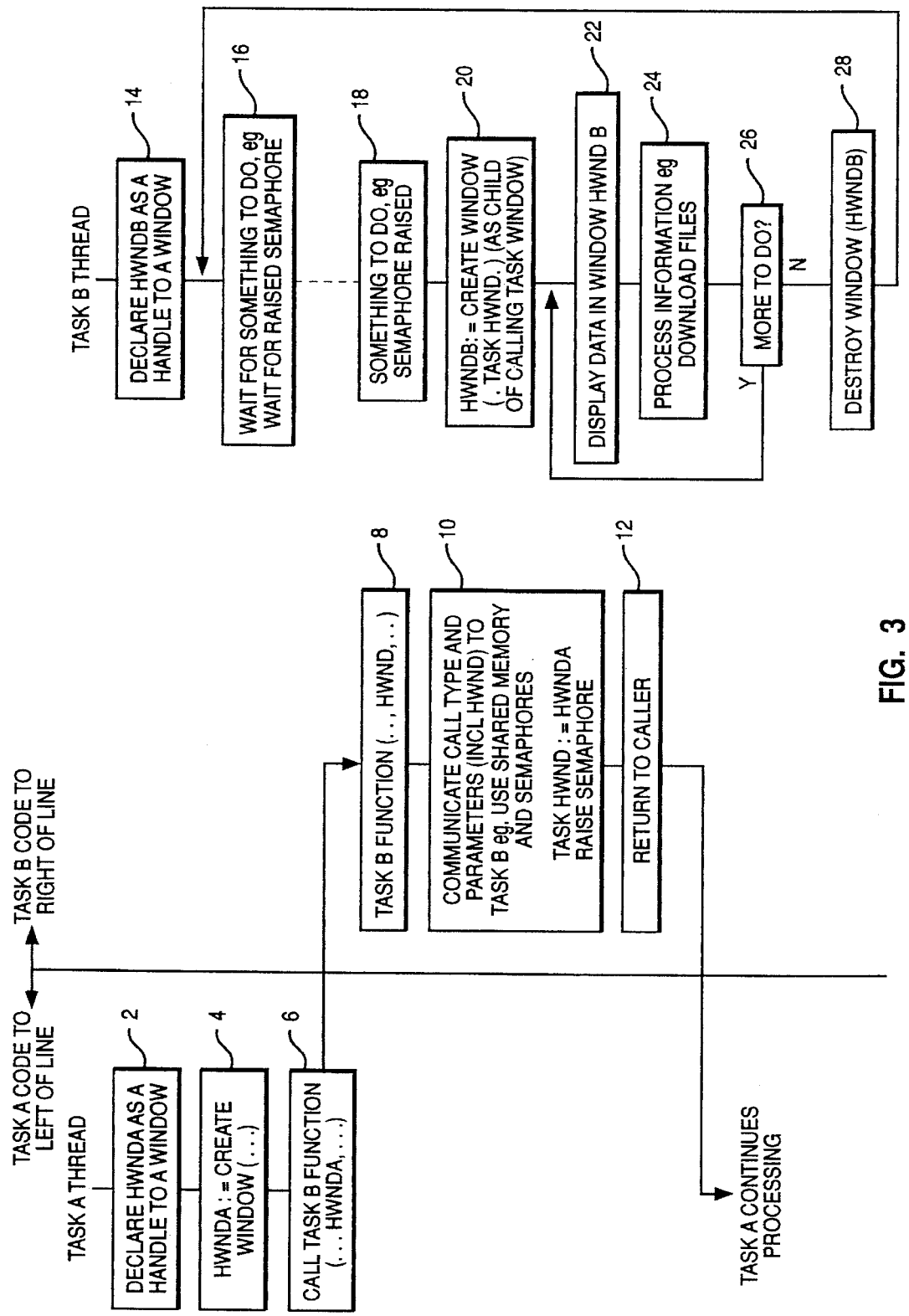

DATA PROCESSING SYSTEM

This is a continuation of application Ser. No. 08/293,252 filed Aug. 19, 1994, abandoned, which is a continuation of application Ser. No. 07/671,838 filed April 2, 1991, abandoned.

BACKGROUND OF THE INVENTION

1. Technical Field

This invention relates to the field of data processing systems. More particularly, this invention relates to the user interface of data processing systems.

In the past the use of data processing systems has typically been large centralised systems operated and controlled by a small number of expert users. However, the use of data processing systems has recently undergone dramatic changes in that small data processing systems (e.g. personal computers) are being used as an everyday working tool by users having jobs ranging from the factory floor to senior management.

These new users are not experts in data processing systems and their priority is that the data processing systems should give them the maximum help with their jobs rather than a desire to become experts in data processing systems. Thus, in order to meet the priorities of these new users, the way in which the user interacts with the data processing system should be made easy to learn and simple to work with, i.e. the user interface should be rationalised.

Great strides have been made in improving the user interfaces of data processing systems. One successful approach has been the development of so called 'window driven systems' such as the Presentation Manager feature of the OS/2 systems of International Business Machines Corporation (Presentation Manager and OS/2 are a trademarks of International Business Machines Corporation)

Such systems provide a number of display areas (windows) whose size, shape and position within the display may be manipulated by the user. Each of these windows presents a different portion of the user interface, i.e. one window may display a menu of program options within a word processing program whilst another displays the text being manipulated by that word processing program.

These windows driven user interfaces have been found to be particularly effective for multitasking data processing systems in which more than one application program is in use at any time, e.g. a word processing program, an electronic mail program, a database program and a graphics program may all be in use at one time. Each of these application programs will have one or more windows by means of which the user interacts with that application. It will be appreciated that the different application programs/tasks are distinct self contained pieces of software such as the application programs listed above. The multitasking system interleaves the execution of the program. Such a mode of operation is quite distinct from the sequential execution of different routines within the same program.

It is a feature of advanced multitasking data processing systems that the tasks executed are becoming more interdependent, i.e. one task may start or call upon another task to carry out some function required by that first task. An example of such interdependence would be one task requiring a particular piece of information to be retrieved from a database by a database retrieval task. The calling task would start the database retrieval task and pass to it details concerning the data required. In prior art systems the calling task would have one set of windows and the called task would have a separated set of windows. In the case of a called database retrieval task its window may provide visual feedback to the user concerning the progress of the search.

Whilst it is desirable to provide this visual feedback, consequential problems do arise. To the non-expert user, the separate window of the called task seems to appear out of nowhere and be unconnected to the window of the calling task. Furthermore, the movement, shrinking or closing of the window of the calling task has no effect on the window of the called task. There is a lack of visual connection between the window(s) of the calling and called tasks. The present invention both recognising and solves this problem.

SUMMARY OF THE INVENTION

The invention provides a data processing system having a window based display and a processor executing a plurality of interleaved data processing tasks each having one or more associated display windows, wherein execution of a first task may trigger execution of a second task characterised in that when execution of said first task triggers execution of said second task, said processor uses data identifying said first task's display window(s) and to control display of said second task's display window(s) so as to be connected to and move with said first task's display window(s).

The invention provides the advantage that display of the window(s) of the called task in a manner connected to the window(s) of the calling task, clarifies to the user the relationship between the tasks. Furthermore, the use of the data identifying the calling task's window(s) makes it possible for the system to monitor any changes in the position or size of the calling task's window(s) and make appropriate changes in size and position to the window(s) of the called task thereby preserving the visual relationship between the tasks.

In preferred embodiments of the invention said data includes identification of a portion of memory storing parameters describing said calling task's window(s). This feature of the invention exploits the manner in which prior art systems such as those having the Presentation Manager feature are organised to minimise the amount of data that need be passed between the programs and minimise the modifications that must be made to the system in order to produce a system embodying the invention. In such a system the control of the display of the windows is carried out by the operating system with each task being responsible for the contents of its windows. The result is that the tasks need only identify their windows to one another and then the function of the operating system may be used to display the windows in the desired manner.

In the case of the Presentation Manager systems each program/window has a so called "window handle" associated with it. This window handle acts as a pointer to a memory location within the system where data describing the associated window is stored. Passing the window handle from the calling to called task allows the called task to set up its window(s) as a so called "child window" of the calling tasks window. Once this structure is established the existing operating system will control the display of the windows in the desired manner.

In preferred embodiments of the invention said second task's window(s) is displayed within said first task's window(s). This form of display provides an unmistakable visual link between the windows of the different tasks. It will however be appreciated that other ways of connecting the windows are possible, e.g. the window(s) of the second task may abut the edge of the window(s) of the first task—the windows may be "clipped together" at their edge.

The invention has been found to be particularly advantageous when said system has the function of downloading files from another system required by said first task and said second task's window(s) provides an indication of the progress of said downloading. In this situation there is a strong need for visual feedback as downloading may take some time and it is also possible that more than one task may be downloading files at any one time and so it is important that the windows giving feedback as to the progress of the download be readily associated with the calling task.

BRIEF DESCRIPTION OF THE DRAWINGS

An embodiment of the invention will now be described, by way of example only, with reference to the accompanying drawings in which:

FIG. 3 schematically illustrates a flow diagram for an embodiment of the invention.

DESCRIPTION OF THE PREFERRED EMBODIMENT

Figure 1:
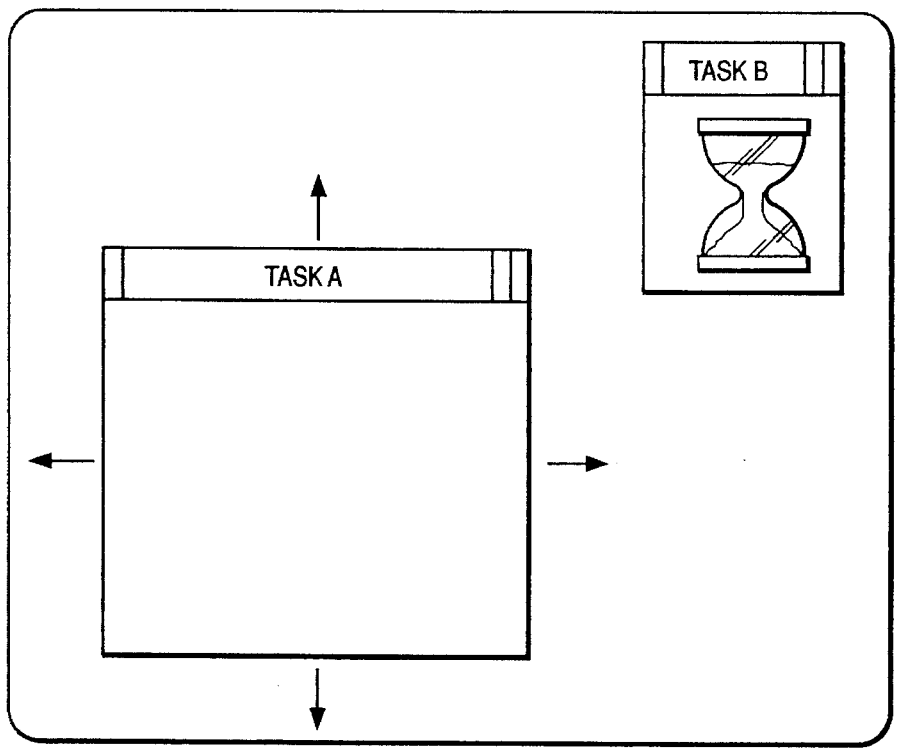
FIG. 1 schematically illustrates a prior art windowing user interface with windows of calling and called tasks.

FIG. 1 schematically illustrates a display in which Task A calls Task B. Both Task A and Task B have separate windows providing visual feedback to the user. The windows of Task A and Task B are not connected, with the result that movement or changing the size of the window for Task A has no effect on the window for Task B. In the case illustrated, Task B has the function of downloading files from a remote system. The window for Task B shows a sand glass in which the flow of the sand through the sand glass gives an indication of the progress of the downloading of the file in question.

It can be seen that the user interface of FIG. 1 suffers from the disadvantage that the window for Task B is not visually connected to the window for Task A and a non-expert user may not be entirely sure what is being monitored by the window for Task B. This problem would be compounded if another program were to concurrently invoke Task B to download a file, since two windows could appear without it being immediately obvious which related to which calling program. Another confusing feature of the prior art is that the window for Task A can be moved or minimised without a corresponding effect on the window for Task B.

Figure 2:
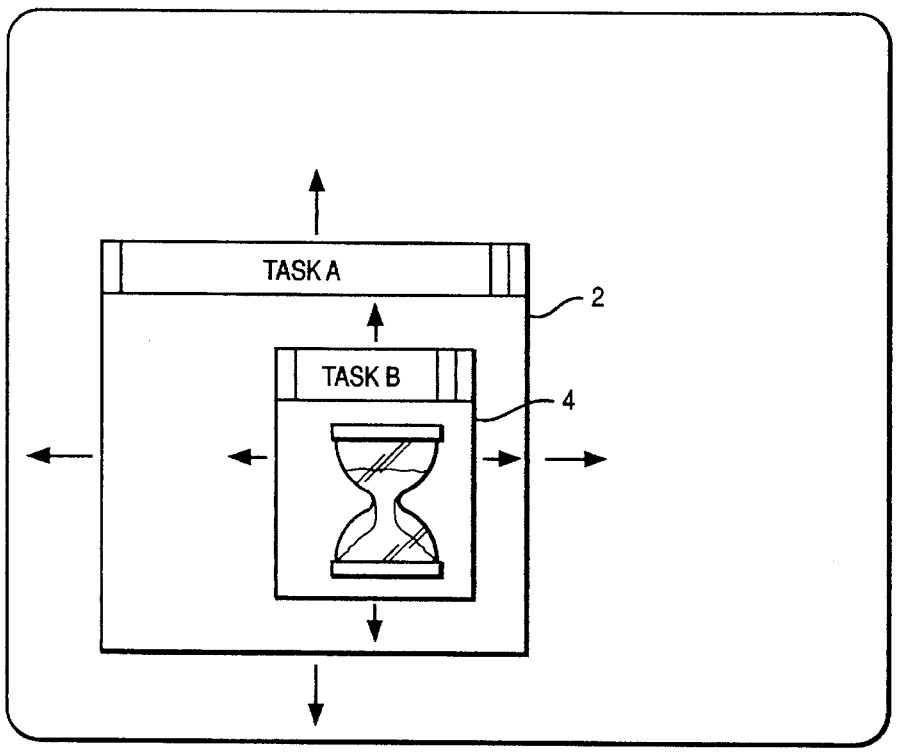
FIG. 2 schematically illustrates the user interface of an embodiment of the invention.

FIG. 2 schematically illustrates the user interface of an embodiment of the present invention. The window of Task B is displayed within the window of Task A and moves with the window of Task A. The relationship between the windows of the two tasks is immediately visually apparent to the user. As is schematically illustrated in FIG. 2 movement of the window for Task A also moves the window for Task B.

The sequence of Programming steps for producing this embodiment of the invention may be represented as follows:

1. Task A puts up a window (2) for Task A
2. Task A calls Task B and passes to Task B the window handle for the window (2) of Task A.
3. Using the window handle for the window (2) of Task A, Task B puts up the window (4) for Task B as a child window of the window (2) of Task A.
4. Task B destroys the window (4) for Task B, when the processing for Task B is completed.
5. Control returns to Task A.

It will be appreciated that the processing for the tasks themselves takes place between the window manipulation steps outlined above.

FIG. 3 schematically illustrates a flow diagram for an embodiment of the invention. The steps on the left of the flow diagram are part of Task A whilst those on the right of the diagram are part of Task B.

Considering first the flow of control within the system which is associated with Task A. At step 2 Task A chooses a window handle—hwndA for the window it wishes to create. At step 4 Task A creates the window by issuing a call to the OS/2 operating system in the known way. At step 6 Task A issues a call triggering the execution of Task B. Included as a parameter within the call is the window handle—hwndA for the window of Task A. Control is then temporarily passed to Task B.

At steps 8 and 10 Task B reads the call and the hwndA using shared memory and raises a semaphore for subsequently triggering the execution of Task B. At step 12 control is returned to Task A which then continues processing.

Task B has previously chosen its window handle at step 14 and has been waiting at step 16 for a semaphore to be raised. Task B is triggered to execute by recognising that the semaphore has been raised at step 18. At step 20 Task B creates its window as a child window of the window for Task A using the standard OS/2 call which requires it to provide the window handle—hwndA for the window of Task A. Task B can read the hwndA form shared memory. At steps 22 and 24 Task B performs its processing function and displays the results in its window. When the processing for Task B has finished (determined by step 26), Task B destroys its window using the know OS/2 call at step 28 and returns to step 16.

The calls for creating parent and child windows, and destroying windows are well known to OS/2 programmers. The detailed coding for programs running on windowing displays will not be described. There are a number of books and manuals available on this subject such as the IBM manual "OS/2 Version 1.1 Programming Guide" and "Programming the OS/2 Presentation Manager" by Charles Petzold which fully describe how to write programs to operate on windowing displays (IBM and OS/2 are trademarks of International Business Machines Corporation).

The key feature in producing the above described embodiment of the invention is the step of the calling task passing its window handle to the called tasks which then used the window handle to establish its own window as a "child window" of the window of the calling task.

I claim:

1. A data processing system, comprising:

means for displaying display windows; and means coupled to said displaying means for:

executing first and second interdependent data processing tasks;

associating said first and second interdependent tasks with respective ones of said display windows;

passing window identification data from said first task to said second task;

triggering execution of said second task in response to execution of said first task; and controlling, in response to said triggering, display of said second task's display window visually connected to and moving with said first task's display window in response to data identifying said first task's display window such that changes to size and position of said first task display window have corresponding changes on said second task display window.

2. A data processing system as claimed in claim 1, wherein said data includes identification of a portion of memory storing parameters describing said first task's display window and said data is made available to said second task.

3. A data processing system as claimed in claim 1, wherein said second task's window is displayed within said first task's window.

4. A data processing system as claimed in claim 1 wherein said second task has a function of downloading files from another data processing system required by said first task and said second task's window provides an indication of a progress of said downloading.

5. A data processing system as claimed in claim 2 wherein said second task's window is displayed within said first task's window.

6. A data processing system as claimed in claim 2 wherein said second task has a function of downloading files from another data processing system required by said first task and said second task's window provides an indication of a progress of said downloading.

7. A data processing system as claimed in claim 3 wherein said second task has a function of downloading files from another data processing system required by said first task and said second task's window provides an indication of a progress of said downloading.

8. A data processing system as claimed in claim 5, wherein said second task has the function of downloading files from another data processing system required by said first task and said second task's window(s) provides an indication of the progress of said downloading.

9. A method of controlling windows on a data processing system having an operating system controlling a plurality of application programs executing within said data processing system, comprising:

identifying memory within said data processing system storing parameters associated with each of said plurality of application programs executing within said data processing system;

passing the identified memory of an active application program window of said plurality of application programs to a second application program via said operating system, said second application program processing an interdependent task required by said first application program;

executing said second application program for said interdependent task in a display window visually connected to and moving with said active application program window such that changes to position and size of said display window results in the corresponding changes to said active application program window.

10. A method of displaying a plurality of display windows in a data processing system, said plurality of windows under the control of an operating system, comprising:

executing a first task in a first display window by said operating system on said data processing system;

calling an interdependent task from said first task and passing memory identification data describing said first task display window to said interdependent task; and executing said interdependent task in response to receiving said memory identification data and simultaneously displaying a second display window, said second display window visually linked to said first display window such that changes to position and size of said first display window are made to said second display window.

11. A method of displaying a plurality of display windows in a data processing system as in claim 10 wherein said second display window is displayed within said first display window.

12. A method of displaying a plurality of display windows in a data processing system as in claim 10 wherein memory identification data is a portion of memory storing parameters describing said first task.

* * * * *